United States Patent [19]

Watanabe

[11] Patent Number: 4,494,853
[45] Date of Patent: Jan. 22, 1985

[54] PHOTOMETRIC METHOD FOR CAMERAS

[75] Inventor: Koji Watanabe, Hachioji, Japan

[73] Assignee: Konishiroku Photo Industry Co., Ltd., Tokyo, Japan

[21] Appl. No.: 286,194

[22] Filed: Jul. 23, 1981

[30] Foreign Application Priority Data

Aug. 2, 1980 [JP] Japan ................................. 55-106600

[51] Int. Cl.³ .................... G03B 7/08; G03B 13/24
[52] U.S. Cl. .................................. 354/478; 354/481; 354/200
[58] Field of Search ................. 354/23 R, 53–56, 354/219, 224, 225, 227, 155, 199–201, 42, 49, 59, 478, 481, 483, 227.1; 350/331 R, 336; 356/225

[56] References Cited

U.S. PATENT DOCUMENTS

| 3,324,776 | 6/1967 | Matsumoto et al. | 354/478 |
| 3,347,143 | 10/1967 | Jacobs | 354/56 |
| 3,724,349 | 4/1973 | von Belvard | 354/200 X |
| 3,866,240 | 2/1975 | Tsujimoto | 354/478 X |
| 4,054,890 | 10/1977 | Shimomura | 354/227.1 |
| 4,174,894 | 11/1979 | Shimomura | 354/59 |
| 4,208,115 | 6/1980 | Proske | 354/219 X |

Primary Examiner—William B. Perkey
Attorney, Agent, or Firm—Jordan B. Bierman

[57] ABSTRACT

In cameras having an automatic exposure control of the through-the-lens photometric type, light exposure is determined by a photoreceptor responsive in turn to photometric sensitivity distribution. Such distribution can be determined by overall photometry, weighted photometry and spot photometry as controlled through the use of an electro-optical element serving as a focusing screen between the reflected incoming light and the photoreceptor. The photometric mode is varied by changing the applied voltage on the electro-optical element.

4 Claims, 3 Drawing Figures

PHOTOMETRIC METHOD FOR CAMERAS

BACKGROUND OF THE INVENTION

1. Field of the Invention

The present invention relates to a photometric method for cameras, particularly to a photometric method for cameras by which photometry in varied photometric sensitivity distributions can be achieved.

2. Description of the Prior Art

In cameras having an automatic exposure control of through-the-lens photometric type, the amount to be exposed to light is determined by a photoreceptor which measures the light for taking a photograph passed through a taking lenses. In measuring, however, there is a problem of photometric sensitivity distribution over an entire picture area, that is, the problem that, at which position of the entire picture area and to what degree of the amount of light, does the photoreceptor receive.

Generally, the configurations of photometric sensitivity distributions are classified as overall photometry, weighted photometry and spot photometry. Overall photometry is the photometric mode that all the luminance of an entire picture area is received by a photoreceptor without any weighting factor, for example, regardless of whether or not an object having high luminance is in the center of a picture area or in a corner thereof, the amount of exposure is the same.

Weighted photometry is the photometric mode in which a specific portion of a picture area (mostly, around the center of a picture area) is measured by giving weight to said portion, for example, when an object having high luminance is in a specific portion of a picture area, the photometry therein is higher in luminance than that measured when said object is in the other portion in the picture area.

Spot photometry is the photometric mode in wich the light from only a portion of a picture area is measured, and in this photometry, the measurement is generally performed by a weighted photometry or an overall photometry, wherein small weight is placed on the neighborhood, in some measure, of the center of a picture area.

However, in these photometry procedures, there are advantages and also disadvantages, therefore it is most desirable to manage a suitable photometric mode according to the states of objects and a photographer's intentions. Especially in a single lens reflex camera of through-the-lens photometric type, the configurations of photometric sensitivity distributions of cameras are determined depending upon the relative position of the optical system of the view-finder and a photoreceptor.

There are some types of cameras in which a plurality of photoreceptors are arranged to switch over from one photometric mode to the other, but in this case, not only a plurality of photoreceptors but also a complicated optical system are required. Therefore, despite it being useful to switch over from one photometric mode to another, the practical application has not generally been applied.

SUMMARY OF THE INVENTION

The present invention, therefore, contemplates making photometric mode switch over from the one to another and vice versa very simply without making the structure complicated, and is to provide a photometric method for cameras by which a photometry in a photometric sensitivity distribution, which is varied according to the differences of the photodiffusiveness, which can be achieved by using an electro-optical element as a focussing screen, in which element the differences of the aforesaid photodiffusiveness are caused by driving voltage.

DESCRIPTION OF THE PREFERRED EMBODIMENTS

Figure 1:
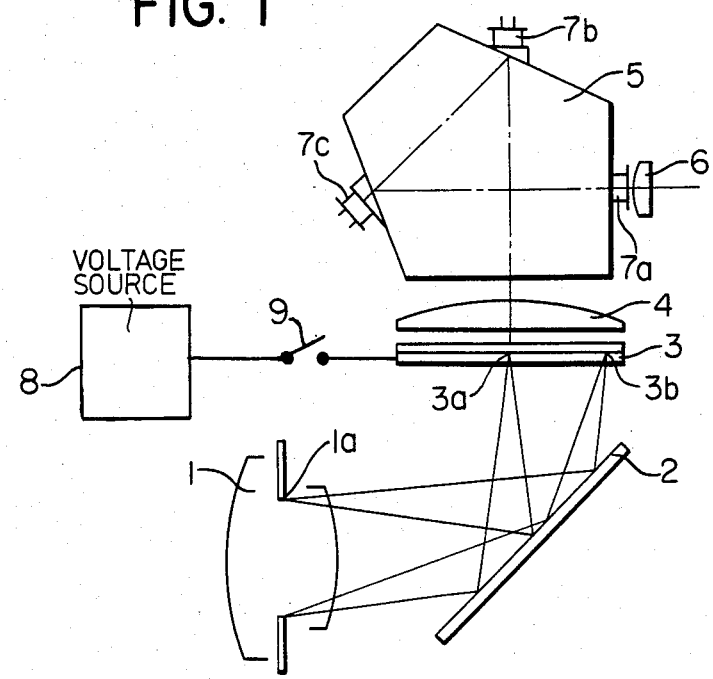
FIG. 1 shows a diagrammatic cross-sectional view of a single-lens-reflex type camera and, FIG. 2(a) and FIG. 2(b) show the distributions of intensity of light and photometric sensitivity distribution curves in the two cases of alternating voltage applied and not applied onto reticle 3 respectively.

The description is now made in detail, referring to the drawings attached hereto.

FIG. 1 shows a cross-sectional view of a single-lens-reflex type camera, wherein a light beam having passed through exit pupil 1a of the lens is reflected by reflection mirror 2 and thus a real image is formed on focussing screen (reticle) 3.

As a secondary light source, the real image formed on focussing screen 3 is refracted by passing through condenser lens 4 and then the image is turned by pentagonal prism 5.

A photographer watches a real image on focussing screen 3 through view-finder lens 6. The number 7 designates wherein as a photoreceptor which is fixed at any of the positions, a, b, c, etc. on pentagonal prism 5 and also optically placed opposite focussing screen 3, and thus a real image on focussing screen 3 is measured thereby.

Generally, photoreceptor 7 is centered on a slightly lower part from the center of a picture area (having a longer horizontal width) by shifting or tilting a little from the optical axis.

As for focussing screen 3 for focussing, a matted surface has so far been provided on a glass or transparent plastic plate and light has been diffused.

The present invention is to use an electro-optical element in which the differences in photodiffusiveness are caused on the focussing screen 3 by the variable drive voltage source 8 connected thereto by switch 9. A current effect type liquid crystal and a phase change type liquid crystal are used as the electro-optical element. A current effect type liquid crystal or a phase change type liquid crystal provides photodiffusion according to the presence of applied alternating current.

Figure 2A:
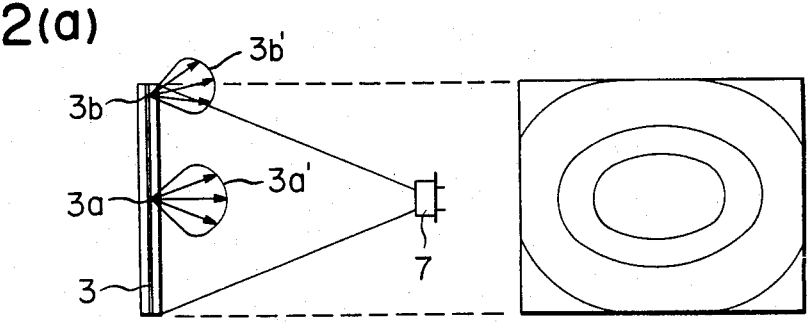

FIG. 2(a) shows the both distribution 3a' of intensity of light at the center 3a of focussing screen 3 and distribution 3b' of intensity of light at the corner 3b of focussing screen 3, in the case where alternating power is applied onto focussing screen 3 used as an electro-optical element. In this case a luminous flux from focussing screen 3 is refracted by passing through condenser lens 4 (omitted in FIGS. 2a and 2b) and is then measured by photoreceptor 7. The figure shown on the right hand side of FIG. 2a are the photometric sensitivity curves obtained; in this case it is assumed that the sensitivity value of the curve most nearest the center of the picture area is at 100, the value of the second curve from the center is at 50, and then the values of the other curves are then at 25, 12, 5 . . . in order respectively from the center thereof, and thus the photometry is performed in a state that is approximately similar to that in overall photometry.

Figure 2B:
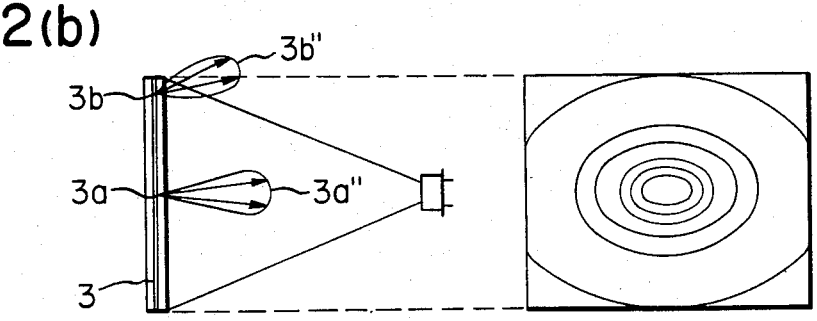

FIG. 2(b) shows the both distribution 3a" of intensity of light at the center 3a of focussing screen 3 and distribution 3b" of intensity of light at the corner 3b of focussing screen 3, in the case when no alternating voltage is applied onto focussing screen 3, that is an electro-optical element. In this case focussing screen 3 serves solely as an image view finder, because focussing screen 3 transmits light. The figure shown on the right hand side whereof is the photometric sensitivity curves obtained in this case, wherein photoreceptor 7 is to measure in a center-weighted photometric mode.

The photoreception amount of photoreceptor 7 is varied naturally with the scale of photodiffusiveness, therefore it is necessary to correct the said amount by means of a resistor or the like, with the joint operation of a change-over switch for alternating voltage application. Nevertheless, in the invention, it has been possible to change the photometric sensitivity distributions by means of a simple view-finder optical system similar to those of conventional type of cameras and also one piece of photoreceptor alone.

Moreover, it is possible to change the photometric sensitivity distributions by changing voltage thanks to the fact that the diffusiveness on focussing screen 3 is varied with the scale of driving voltage, and there has been demonstrated the effects that a photographer can easily change the configurations of photometric sensitivity distributions easily according to scenes to be photographed, and can set the most suitable exposure conditions.

What is claimed is:

1. The method of varying photometric sensitivity distribution in a camera having an automatic exposure control of the through-the-lens photometric type in which the amount of exposure is determined by a photoreceptor, which includes the steps of passing the light from the picture area to the photoreceptor and to a view finder through a focusing screen comprising an electro-optical element, and varying the photometric sensitivity distribution by controlling the voltage applied to said electro-optical element, whereby an operator is able to confirm the focusing situation and photometry range through said view finder.

2. Method according to claim 1 in which the photometric sensitivity distribution is varied according to an overall weight, or spot photometry pattern.

3. In a camera having an automatic exposure control of the through-the-lens photometric type in which the amount of exposure is determined by a photoreceptor, the combination of a view finder, means controlling the photometric sensitivity distribution of the camera comprising a focusing screen in the form of an electro-optical element, a mirror directing incoming light upon said electro-optical element, a prism supporting said photoreceptor and adapted to direct light from said electro-optical element to said photoreceptor and to said view finder, and a source of driving voltage applied to said electro-optical element for controlling the distribution of the intensity of light therefrom, whereby an operator is able to confirm the focusing situation and photometry range through said view finder.

4. In a camera according to claim 3, in which said focusing screen is an electro-optical element, and in which said last means comprises means varying the driving voltage applied to said element.

* * * * *